United States Patent
Aitken

(10) Patent No.: US 6,246,800 B1
(45) Date of Patent: Jun. 12, 2001

(54) LOSS-LESS COMPRESSION AND DECOMPRESSION OF BITMAPS USING STROKES

(75) Inventor: Andrew Peter Aitken, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/147,990

(22) PCT Filed: Oct. 10, 1997

(86) PCT No.: PCT/GB97/02794

§ 371 Date: Mar. 24, 1999

§ 102(e) Date: Mar. 24, 1999

(87) PCT Pub. No.: WO98/16902

PCT Pub. Date: Apr. 23, 1998

(30) Foreign Application Priority Data

Oct. 15, 1996 (GB) ................................................ 96307483

(51) Int. Cl.[7] ........................................................ G06K 9/36
(52) U.S. Cl. ........................ 382/245; 382/202; 382/233; 358/261.1; 345/17
(58) Field of Search ................................... 382/245, 244, 382/246, 239, 232–233, 181, 187, 198, 200, 202; 358/261.1–261.3, 427; 345/467–472, 17, 173–179; 400/110

(56) References Cited

U.S. PATENT DOCUMENTS

| | | | |
|---|---|---|---|
| 4,298,945 | * 11/1981 | Kyte et al. | 345/469 |
| 4,660,028 | 4/1987 | Yu | 345/17 |
| 4,876,607 | * 10/1989 | Tseng | 358/261.2 |
| 4,888,645 | * 12/1989 | Mitchell et al. | 358/261.1 |
| 5,131,766 | 7/1992 | Wong | 400/110 |
| 5,524,182 | * 6/1996 | Chari et al. | 358/1.11 |
| 5,579,030 | * 11/1996 | Karow | 345/471 |
| 6,075,892 | * 6/2000 | Fan et al. | 382/198 |
| 6,181,825 | * 1/2001 | Ragaland et al. | 382/239 |

FOREIGN PATENT DOCUMENTS

| | | | |
|---|---|---|---|
| 2141797 | 5/1990 | (JP) | G09G/5/24 |
| WO 95/10819 | 4/1995 | (WO) | G06K/9/46 |

* cited by examiner

Primary Examiner—Leo Boudreau
Assistant Examiner—Ishrat Sherali

(57) ABSTRACT

A method of compressing a bitmap of a symbol includes dividing up the symbol into one or more strokes which include a number of parallel, laterally adjacent, continuous line segments, run-length encoding each stroke to form a stream of line codes for that stroke, where the stream of line codes provides absolute values for position and length of one line segment and relative values of position and length for the other line segments; and then presenting the streams of the line codes in sequence, as a set representing the symbol.

7 Claims, 6 Drawing Sheets

LOSS-LESS COMPRESSION AND DECOMPRESSION OF BITMAPS USING STROKES

FIELD OF THE INVENTION

This invention relates generally to loss-less compression and decompression of bitmaps, and in particular to a method of compressing a bitmap of a symbol, a compressed bitmap of a symbol, a method of decompressing a compressed bitmap, and a computer for decompressing a compressed bitmap.

BACKGROUND OF THE INVENTION

It is known to compress bitmaps, for example using run-length and outline techniques, so that less space is required to store them and so that less time is required to transmit them at a particular transmission rate. However, compression and decompression take time and processing power. For example, the world-wide-web has generated a need to have a range of large banner fonts. These can be stored and transmitted as outlines, which are compact, but a significant amount of processing power is required to render or decompress them from this form.

SUMMARY OF THE INVENTION

The present invention is concerned with providing high compression ratios of bitmaps, and with providing fast decompression. The invention is more particularly, but not exclusively, concerned with a compression/decompression scheme which enables compressed symbol files to be decompressed with simple or cheap processors and dedicated hardware, thus making the invention particularly useful for world-wide-web/internet browsers or viewers.

In accordance with a first aspect of the present invention, there is provided a method of compressing a bitmap of a symbol, in which the symbol is considered as being made up of a plurality of strokes, and each stroke is considered as being made up of a plurality of continuous lines, and comprising the steps of: run-length encoding each stroke to form a stream of line codes for that stroke; and presenting the streams of the lines codes for the strokes in sequence as a set.

It will therefore be appreciated that the invention provides a development of run-length encoding. However, the separation of the symbol into a plurality of strokes removes the need to encode the white space between those strokes, as it can be inferred to be background. By contrast, with simple run-length encoding, such white space tends to produce long variable-length runs which do not compress well.

In one example of the method, the step of run-length encoding each stroke comprises the steps of: encoding each line or group of lines of that stroke by one of a plurality of encoding methods to form a line code; and presenting the line codes as a stream in the order in which the lines appear in that stroke, at least some of the lines each being encoded in dependence upon their position and length relative to the preceding line in that stroke.

At least one of the encoding methods may produce such a line code comprising: a control code indicative of that encoding method; and at least one parameter value for that control code. Various of these encoding methods may comprise the step of providing, as such parameter values:

(a) a two-dimensional position of one end of the respective line; and the length of that line; or (b) a two-dimensional position of one end of the respective line; and a one-dimensional position of the other end of that line; or (c) an offset between one end of the respective line and one end of the preceding line; and a difference between the length of the respective line and that of the preceding line; or (d) an offset between one end of the respective line and one end of the preceding line; and an offset between the other end of the respective line and the other end of the preceding line; or (e) a number of repeats of the previous line; or (f) a number of lines; and for each line in that number an indication of whether or not each end of that line is offset by one pixel in the line direction from the corresponding end of the preceding line (in this case, the encoding method may further include the step of providing, as such a parameter value: an indication of whether the offset (if any) of one end of each of the respective lines is in one direction or in the opposite direction).

At least one of the encoding methods may produce, as such a line code, a parameterless control code. For example, at least some of the parameterless control codes may each be:

(g) a predetermined function of: an offset between one end of the respective line and one end of the preceding line; and a difference between the length of the respective line and that of the preceding line; or (h) a predetermined function of: an offset between one end of the respective line and one end of the preceding line; and an offset between the other end of the respective line and the other end of the preceding line.

By suitable choice of these methods, specific features of symbols (or parts of them) can be taken into account to produce a compression ratio which is perhaps more than twice that which is achievable using simple run-length encoding. Many symbols have a high degree of correlation between vertically adjacent horizontal pixel rows, and this can be taken advantage of, particularly by methods (c) to (h), to produce high compression ratios.

At least some of these encoding methods may be paired. For example:

(i) in the case of a pair of methods (c) above, the maximum offset and/or difference for one of those two methods may be different to that or those for the other of those two methods; or (j) in the case of a pair of methods (d) above, the or each maximum offset for one of those two methods may be different to that or those for the other of those two methods; or (k) in the case of a pair of methods (e) above, the maximum number of repeats for one of those two methods may be different to that for the other of those two methods.

It will therefore be appreciated that, by choosing the method with the smaller maximum, if that is possible, to encode a particular line or group of lines, fewer bits are produced. Preferably the method further comprises the step of adding a header indicative of the number of streams in the set and the length of each stream.

In accordance with a second aspect of the present invention, there is provided a compressed bitmap of a symbol, produced by the method of the first aspect of the invention.

In accordance with a third aspect of the present invention, there is provided a compressed bitmap of a symbol which is considered as being made up of a plurality of strokes each of which is considered as being made up of a plurality of continuous lines, the compressed bitmap comprising: for each of the strokes, a plurality of run-length encoded line codes each for one of the lines or a group of the lines in that stroke, the line codes being arranged as a stream in the order in which the lines appear in that stroke, and the streams of the lines codes for the strokes being arranged in sequence as a set. Preferably, the lines codes are encoded by a plug of encoding methods, at least some of the lines each being encoded in dependence upon their position and length relative to the preceding line in that stroke.

In accordance with a fourth aspect of the present invention, there is provided a method of decompressing a compressed bitmap according to the second or third aspect of the invention, and comprising the steps of: decoding each line code to form a respective line definition; and rendering the line defined by each line definition. Preferably, decoding of at least two of the streams of line codes temporally overlap each other. In the case of decoding a parametered line code as mentioned above, the decoding step may comprise the steps of determining the control code in the parametered line code, determining the or each parameter of that line code, and forming the line definition in accordance with the value of the control code and the value of the or each parameter. In the case of decoding a parameterless line code as mentioned above, the decoding step may comprise the step of forming the line definition in accordance the value of the control code.

In accordance with a fifth aspect of the present invention, there is provided a computer which is programmed by software to perform the method according to the fourth aspect of the present invention. The invention may therefore be applicable to a general purpose computer which is programmed by software to produce the technical advantages of the invention.

In accordance with a sixth aspect of the present invention, there is provided a computer comprising: a processor; memory accessible by the processor for storing data including a compressed bitmap, according to the second or third aspect of the present invention, and rendered symbol data; and a decompressor circuit, the decompressor circuit comprising: means for generating coordinate value pairs; and at least one stroke engine operable to read a stream of the line codes from the memory and to decode the line codes in dependence upon the coordinate value pairs to produce an output signal. The decompressor circuit may have a plurality of such stroke engines and further include an access arbiter for arbitrating requests from the stroke engines to access the memory. The generating means may comprise: a first sequencer which is operable to step through values of one of the coordinates; a second sequencer which, for each value of said one coordinate, is operable to step through values of the other coordinate; and a write controller which is operable to address the memory in dependence upon the coordinate values and supply data to the memory in dependence upon the output signal(s).

BRIEF DESCRIPTION OF THE DRAWINGS

A specific embodiment of the present invention will now be described by way of non-limiting example with reference to the accompanying drawings, in which.

DETAILED DESCRIPTION

Figure 1:
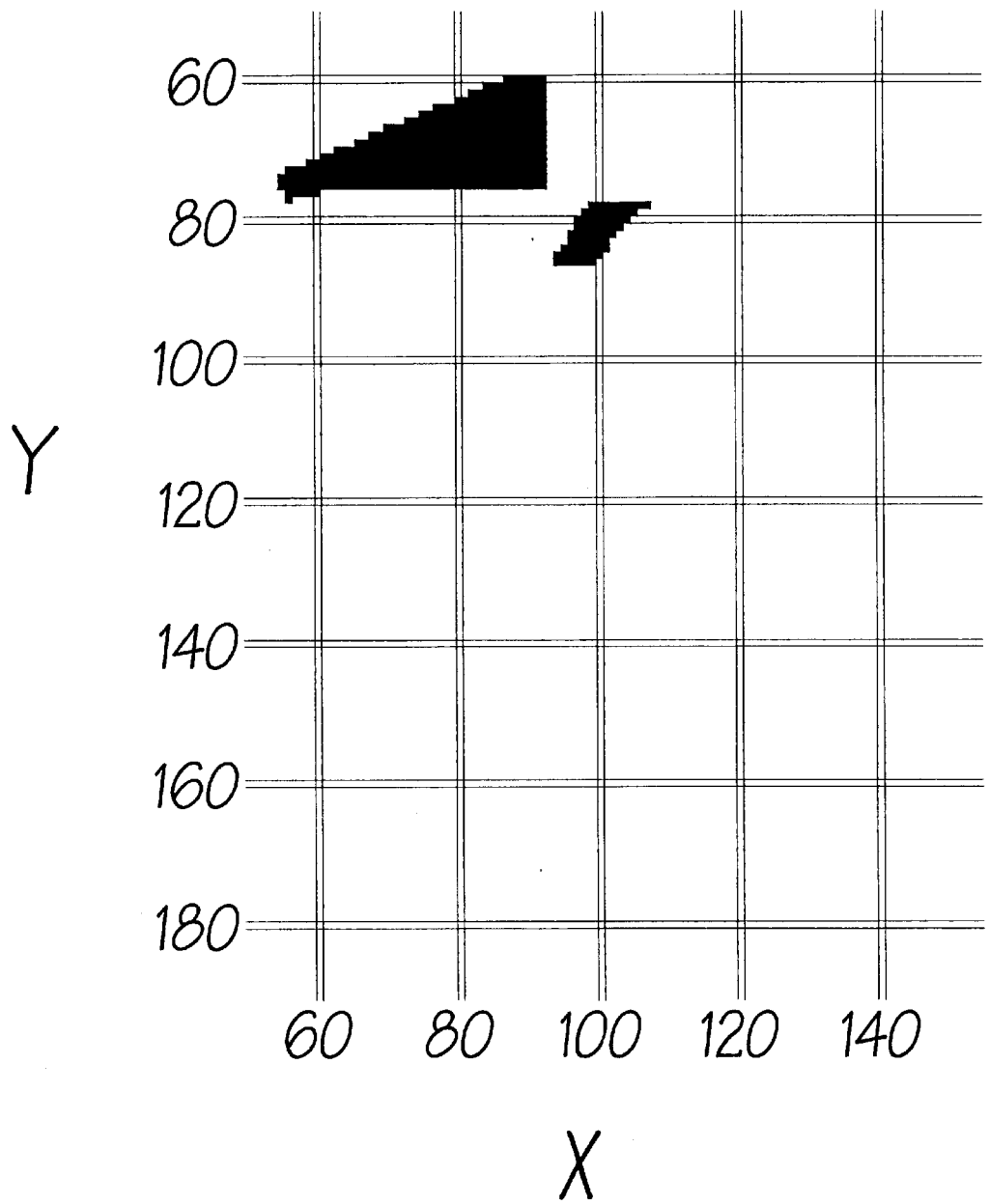
FIG. 1 shows a first stroke, comprising a pair of elements, produced by decoding a first bitstream for forming a Times Roman lower case letter "r"

In the example of the invention which is now to be described, a symbol file consists of two parts, a simple header and a data-part consisting of one or more bitstreams.

The header defines how many bitstreams are present in the data-part and gives the length in bits of each bitstream. There is a maximum of 15 ($2^4$−1) bitstreams, and each bitstream can be a maximum of 4095 ($2^{12}$−1) bits long. Numeric data is defined (within both the header and the data-part) using a varying length representation with least-significant bits first, e.g. a 5 bit code is stored in the order bit 0, bit 1, etc. This is referred to in this specification "LSBF" binary.

Symbol metrics are not stored within the symbol file, but may be contained in a separate kerning/separation table pertinent to a set of symbol files.

Specifically, in the example, the header of the symbol file data is structured as: the number of bitstreams, which is an unsigned 4 bit integer; and, for each bitstream, the length of that bitstream as an unsigned 12 bit integer, so that an array of unsigned 12 bit integers is provided.

The data part of the symbol file contains, in sequence, the bit data for each of the bitstreams.

The pixel coordinate convention used in the example is that the coordinate origin (0, 0) is the top left of a bounding box around the symbol, with increasing X going to the right and increasing Y going downwards. The symbol is considered as drawn in ink on a background of unspecified colour. For example, the background could be white or transparent. The encoding only specifies where the ink of the symbol occurs. The rectangular width and height of the bounding box are each never greater than 255.

A bitstream holds a compressed representation of one or more strokes. Each stroke within the bitstream can be separated by sequential decoding of the bitstream.

The separation of the data into bitstreams matches the stroke-based structure of the symbol. There are at least the same number of bitstreams as the maximum number of strokes that ever occurs across the symbol. Therefore, each bitstream is intended to be directed at a 'stroke-primitive' renderer that can function independently and concurrently with the render operations caused by the other bitstreams (since the strokes preferably never overlap). The file structure allows concurrent access to multiple bitstreams within the file through the bitstream length information.

The bitstream bit data is organised as a stream of short control codes. Each control code is defined to be followed by zero or more parameters codes, the number of parameters and their sizes being specified for each control code by the symbol format. Variable length integer encoding contributes significantly to good compression.

True entropy coding of the control codes is not used in the example given, but could probably extract further compression, although the varying length of the various control codings is a form of entropy code and was chosen from actual symbol statistics. The parameter ranges currently overlap slightly for different control code representations of the same data. If desired, such overlap could be removed so as to improve further the compression efficiency.

Strokes are encoded as being drawn downwards in the coordinate convention (i.e. increasing Y). For control codes that affect only one row the Y coordinate is assumed to always increase by 1 after performing the action of that control code. There is also a set of repeating control codes that generate more than one row and therefore give good compression. The repeating codes cater for true repeats as well as for runs of very small ('micro') changes which are encoded in an efficient 2-bit code. In both cases the multiple rows are assumed to start at the current Y coordinate and extend downwards with increasing Y.

In the example, the bitstream control codes are as follows:

STROKE_START

This is a 5 bit unsigned integer of value 31 (11111) and it is always followed by three parameters X, Y, W, where: X is an unsigned 8 bit integer (i.e. 0 to 255); Y is an unsigned 8 bit integer; and W is an unsigned 8 bit integer, to give a line code of the form (STROKE_START, X, Y, W), or (31, X, Y, W). The parameters X, Y are the coordinates of the left edge of a horizontal ink run of length W which extends to the right of this coordinate. In the example, a stream of bitstream data must always start with a STROKE_START code. A new stroke can be started within a bitstream by using another STROKE_START code.

BIG_CHANGE

This is a 5 bit unsigned integer of value 30 (01111) and is always followed by two parameters $\Delta X$, $\Delta W$, where: $\Delta X$ is a signed 7 bit integer (ie $-128+127$); and $\Delta W$ is a signed 7 bit integer, to give a line code of the form (BIG_CHANGE, $\Delta X$, $\Delta W$) or (30, $\Delta X$, $\Delta W$). The parameters $\Delta X$ and $\Delta W$ modify the current X coordinate and length W of the run such that: $X \rightarrow X+\Delta X$; and $W \rightarrow W+\Delta W$.

MEDIUM_CHANGE

This is a 5 bit unsigned integer of value 29 (10111) and is always followed by two parameters $\Delta X$, $\Delta W$, where: $\Delta X$ is a signed 4 bit integer (ie $-16$ to $+15$); and $\Delta W$ is a signed 4 bit integer, to give a line code of the form (MEDIUM_CHANGE, $\Delta X$, $\Delta W$) or (29, $\Delta X$, $\Delta W$). The parameters $\Delta X$ and $\Delta W$ modify the current X coordinate and length W of the run such that: $X \rightarrow X+\Delta X$; and $W \rightarrow W+\Delta W$.

REPEAT

This is a 5 bit unsigned integer of value 28 (00111) and is always followed by one parameter REPEAT_COUNT which is an unsigned 8 bit integer to give a line code of the form (REPEAT, REPEAT_COUNT) or (28, REPEAT_COUNT). The parameter REPEAT_COUNT is the number of times to repeat the current run definition but with Y increasing at each repeat.

REPEAT_SMALL

This is a 5 bit unsigned integer of value 27 (11011) and is always followed by one parameter REPEAT_COUNT which is an unsigned 4 bit integer to give a line code of the form (REPEAT_SMALL, REPEAT_COUNT) or (27, REPEAT_COUNT). The parameter REPEAT_COUNT is the number of times to repeat the current run definition but with Y increasing at each repeat.

MICRO_CHANGE_RUN

This is a 5 bit unsigned integer of value 25 (10011) and is always followed by the parameters MICRO_RUN_TYPE and MICRO_RUN_CHANGES and then a number of parameters RUN_CHANGES equal in number to the value of the parameter MICRO_RUN_CHANGES, where: MICRO_RUN_TYPE is an unsigned 1 bit integer (i.e. 0=left or 1=right); MICRO_RUN_CHANGES is an unsigned 8 bit integer; and RUN_CHANGES are each an unsigned 2 bit integer. There are MICRO_RUN_CHANGES run-change elements coding differential very small RUN_CHANGES for a set of consecutive rows. The run-change codes are different for the left and right cases, as follows:

TABLE 1

| MICRO_RUN_TYPE (0 = left; 1 = right) | RUN_CHANGES (Decimal) | RUN_CHANGES (LSBF binary) | $\Delta X$ | $\Delta W$ |
|---|---|---|---|---|
| 0 | 0 | 00 | 0 | 0 |
| 0 | 1 | 10 | −1 | 1 |
| 0 | 2 | 01 | −1 | 0 |
| 0 | 3 | 11 | 0 | −1 |
| 1 | 0 | 00 | 0 | 0 |
| 1 | 1 | 10 | 0 | 1 |
| 1 | 2 | 01 | 1 | 0 |
| 1 | 3 | 11 | 1 | −1 |

LITTLE_CHANGE

This is a 5 bit unsigned integer of value 0 to 24 (00000 to 00011) without any additional parameters and is used to encode small values for $\Delta X$ and $\Delta W$ using: $\Delta X=$(LITTLE_CHANGE/5)$-2$; and $\Delta W=$(LITTLE_CHANGE % 5)$-2$, where % is the modulus (remainder) operator. Hence $\Delta X$ and $\Delta W$ can each vary from $-2$ to $+2$ as follows:

TABLE 2

| LITTLE_CHANGE | $\Delta X$ | $\Delta W$ |
|---|---|---|
| 0 | −2 | −2 |
| 1 | −2 | −1 |
| 2 | −2 | 0 |
| 3 | −2 | 1 |
| 4 | −2 | 2 |
| 5 | −1 | −2 |
| 6 | −1 | −1 |
| 7 | −1 | 0 |
| 8 | −1 | 1 |
| 9 | −1 | 2 |
| 10 | 0 | −2 |
| 11 | 0 | −1 |
| 12 | 0 | 0 |
| 13 | 0 | 1 |
| 14 | 0 | 2 |
| 15 | 1 | −2 |
| 16 | 1 | −1 |
| 17 | 1 | 0 |
| 18 | 1 | 1 |
| 19 | 1 | 2 |
| 20 | 2 | −2 |
| 21 | 2 | −1 |
| 22 | 2 | 0 |
| 23 | 2 | 1 |
| 24 | 2 | 2 |

In summary, therefore, the line codes used in the example are as follows:

TABLE 3

| Code Name | Control Code (decimal) | Control Code (LSBF binary) | Primary Parameters | Secondary Parameters |
|---|---|---|---|---|
| STROKE_START | 31 | 11111 | $X_8, Y_8, W_8$ | None |
| BIG_CHANGE | 30 | 01111 | $\Delta X_7, \Delta W_7$ | None |
| MEDIUM_CHANGE | 29 | 10111 | $\Delta X_4, \Delta W_4$ | None |
| REPEAT | 28 | 00111 | REPEAT_COUNT$_8$ | None |
| REPEAT_SMALL | 27 | 11011 | REPEAT_COUNT$_4$ | None |
| MICRO_RUN_CHANGE | 25 | 10011 | MICRO_RUN_TYPE$_1$, MICRO_RUN_ | For 1 to MICRO_RUN_ |

TABLE 3-continued

| Code Name | Control Code (decimal) | Control Code (LSBF binary) | Primary Parameters | Secondary Parameters |
|---|---|---|---|---|
| | | | CHANGES$_8$ | CHANGES: RUN_ CHANGES$_2$ |
| LITTLE_ CHANGE | 0 to 24 | 00000 to 00011 | None | None |

In Table 3, the subscripts denote the number of bits of the respective parameters.

A specific example of decoding a symbol file will now be described with reference to Table 4, in which the following stream of 753 bits of binary data is divided up, analysed, and used to render the symbol shown in FIGS. 1 to 4:

```
11001110 01110000 01100111 00000011 11110000 11111111 01010001 11100011
00000101 11101111 00001000 01001011 11011110 00010000 10010111 10111100
00100001 00101111 01111000 01000010 01011110 11110000 01000110 01111100
00001111 10110111 00000011 01111110 10100001 00011100 01100100 11001100
00011011 11001111 11111110 11100011 11000001 00001011 11011011 01011101
11001010 11101111 10010010 10010101 11011111 00100100 00101001 00011010
01010011 00110000 01010100 01010011 11101100 01100111 10111010 01011001
01000011 11101111 00010111 11010111 01001011 10111010 00011111 11110000
10001100 10010110 00001010 00010000 10011000 00111011 00100000 11011100
00011010 01101101 00000011 11001100 11001100 11001110 01111001 01101101
10010100 10001101 01100001 01011010 01010010 10111011 10010101 11011100
10011110 01111100 11010111 10011000 11011110 0
```

TABLE 4

| Code LSBF Binary | Bits | No. of Bitstreams (decimal) |
|---|---|---|
| HEADER | | |
| 1100 | 4 | 3 |
| | | Bitstream Length (decimal) |
| 111001110000 | 12 | 231 |
| 011001110000 | 12 | 230 |
| 001111110000 | 12 | 252 |
| Header length | 40 | |

| Code LSBF Binary | Bits | Line Code (decimal) | Y | ΔX | ΔW | X$^-$ | W | X$^+$ |
|---|---|---|---|---|---|---|---|---|
| BITSTREAM 1 | | | | | | | | |
| 11111 11101010 00111100 01100000 | 29 | 31 87 60 6 | 60 | | | 87 | 6 | 92 |
| 10111 1011 1100 | 13 | 29 −3 3 | 61 | −3 | 3 | 84 | 9 | 92 |
| 00100 | 5 | 4 | 62 | −2 | 2 | 82 | 11 | 92 |
| 00100 | 5 | 4 | 63 | −2 | 2 | 80 | 13 | 92 |
| 10111 1011 1100 | 13 | 29 −3 3 | 64 | −3 | 3 | 77 | 16 | 92 |
| 00100 | 5 | 4 | 65 | −2 | 2 | 75 | 18 | 92 |
| 00100 | 5 | 4 | 66 | −2 | 2 | 73 | 20 | 92 |
| 10111 1011 1100 | 13 | 29 −3 3 | 67 | −3 | 3 | 70 | 23 | 92 |
| 00100 | 5 | 4 | 68 | −2 | 2 | 68 | 25 | 92 |
| 00100 | 5 | 4 | 69 | −2 | 2 | 66 | 27 | 92 |
| 10111 1011 1100 | 13 | 29 −3 3 | 70 | −3 | 3 | 63 | 30 | 92 |
| 00100 | 5 | 4 | 71 | −2 | 2 | 61 | 32 | 92 |
| 00100 | 5 | 4 | 72 | −2 | 2 | 59 | 34 | 92 |
| 10111 1011 1100 | 13 | 29 −3 3 | 73 | −3 | 3 | 56 | 37 | 92 |
| 00100 | 5 | 8 | 74 | −1 | 1 | 55 | 38 | 92 |
| 00100 | 5 | 12 | 75 | 0 | 0 | 55 | 38 | 92 |
| 01111 1000000 1111101 | 19 | 30 1 −33 | 76 | 1 | −33 | 56 | 5 | 60 |
| 10111 0000 0011 | 13 | 29 0 −4 | 77 | 0 | −4 | 56 | 1 | 56 |
| 01111 1101010 0001000 | 19 | 30 43 8 | 78 | 43 | 8 | 99 | 9 | 107 |
| 11100 | 5 | 7 | 79 | −1 | 0 | 98 | 9 | 106 |
| 01100 | 5 | 6 | 80 | −1 | −1 | 97 | 8 | 104 |
| 10011 0 01100000 11 01 11 10 01 11 | 26 | 25 0 6 3 2 3 1 2 3 | 81 | 0 | −1 | 97 | 7 | 103 |
| | | | 82 | −1 | 0 | 96 | 7 | 102 |
| | | | 83 | 0 | −1 | 96 | 6 | 101 |
| | | | 84 | −1 | 1 | 95 | 7 | 101 |
| | | | 85 | −1 | 0 | 94 | 7 | 100 |

TABLE 4-continued

|  |  |  |  | 86 | 0 | −1 | 94 | 6 | 99 |
|---|---|---|---|---|---|---|---|---|---|
| Bitstream length | 231 |  |  |  |  |  | Line length | 449 |  |
|  |  | BITSTREAM 2 |  |  |  |  |  |  |  |
| 11111 11101110 00111100 00010000 | 29 | 31 119 60 8 | | 60 | | | 119 | 8 | 126 |
| 10111 1011 0110 | 13 | 29 −3 6 | | 61 | −3 | 6 | 116 | 14 | 129 |
| 10111 0111 0010 | 13 | 29 −2 4 | | 62 | −2 | 4 | 114 | 18 | 131 |
| 10111 0111 1100 | 13 | 29 −2 3 | | 63 | −2 | 3 | 112 | 21 | 132 |
| 10010 | 5 | 9 | | 64 | −1 | 2 | 111 | 23 | 133 |
| 10010 | 5 | 9 | | 65 | −1 | 2 | 110 | 25 | 134 |
| 10111 0111 1100 | 13 | 29 −2 3 | | 66 | −2 | 3 | 108 | 28 | 135 |
| 10010 | 5 | 9 | | 67 | −1 | 2 | 107 | 30 | 136 |
| 00010 | 5 | 8 | | 68 | −1 | 1 | 106 | 31 | 136 |
| 10010 | 5 | 9 | | 69 | −1 | 2 | 105 | 33 | 137 |
| 00010 | 5 | 12 | | 70 | 0 | 0 | 105 | 33 | 137 |
| 10010 | 5 | 9 | | 71 | −1 | 2 | 104 | 35 | 138 |
| 10011 0 01100000 10 10 10 00 10 10 | 26 | 25 0 6 1 1 1 0 1 1 | | 72 | −1 | 1 | 103 | 36 | 138 |
|  |  |  |  | 73 | −1 | 1 | 102 | 37 | 138 |
|  |  |  |  | 74 | −1 | 1 | 101 | 38 | 138 |
|  |  |  |  | 75 | 0 | 0 | 101 | 38 | 138 |
|  |  |  |  | 76 | −1 | 1 | 100 | 39 | 138 |
|  |  |  |  | 77 | −1 | 1 | 99 | 40 | 138 |
| 01111 1011000 1100111 | 19 | 30 13 −13 | | 78 | 13 | −13 | 112 | 27 | 138 |
| 10111 0100 1011 | 13 | 29 −2 3 | | 79 | 2 | −3 | 114 | 24 | 137 |
| 00101 | 5 | 20 | | 80 | 2 | −2 | 116 | 22 | 137 |
| 00001 | 5 | 16 | | 81 | 1 | −1 | 117 | 21 | 137 |
| 11110 | 5 | 15 | | 82 | 1 | −2 | 118 | 19 | 136 |
| 11110 | 5 | 15 | | 83 | 1 | −2 | 119 | 17 | 135 |
| 00101 | 5 | 20 | | 84 | 2 | −2 | 121 | 15 | 135 |
| 11110 | 5 | 15 | | 85 | 1 | −2 | 122 | 13 | 134 |
| 10111 0100 1011 | 13 | 29 2 −3 | | 86 | 2 | −3 | 124 | 10 | 133 |
| 10111 0100 1011 | 13 | 29 2 −4 | | 87 | 2 | −4 | 126 | 6 | 131 |
| Bitstream length | 230 |  |  |  |  |  | Line length | 701 |  |
|  |  | BITSTREAM 3 |  |  |  |  |  |  |  |
| 11111 11000010 00110010 01011000 | 29 | 31 67 76 26 | | 76 | | | 67 | 26 | 92 |
| 00101 | 5 | 20 | | 77 | 2 | −2 | 69 | 24 | 92 |
| 00001 | 5 | 16 | | 78 | 1 | −1 | 70 | 23 | 92 |
| 00001 | 5 | 16 | | 79 | 1 | −1 | 71 | 22 | 92 |
| 00110 | 5 | 12 | | 80 | 0 | 0 | 71 | 22 | 92 |
| 00001 | 5 | 16 | | 81 | 1 | −1 | 72 | 21 | 92 |
| 11011 0010 | 9 | 27 4 | | 82 | 0 | 0 | 72 | 21 | 92 |
|  |  |  |  | 83 | 0 | 0 | 72 | 21 | 92 |
|  |  |  |  | 84 | 0 | 0 | 72 | 21 | 92 |
|  |  |  |  | 85 | 0 | 0 | 72 | 21 | 92 |
| 00001 | 5 | 16 | | 86 | 1 | −1 | 73 | 20 | 92 |
| 10111 0000 0110 | 13 | 29 0 6 | | 87 | 0 | 6 | 73 | 26 | 98 |
| 10011 0 11010000 00 11 11 00 11 00 11 00 11 00 11 | 36 | 25 0 1 1 0 3 3 0 3 0 3 0 3 | | 88 | 0 | 0 | 73 | 26 | 98 |
|  |  |  |  | 89 | 0 | −1 | 73 | 25 | 97 |
|  |  |  |  | 90 | 0 | −1 | 73 | 24 | 96 |
|  |  |  |  | 91 | 0 | 0 | 73 | 24 | 96 |
|  |  |  |  | 92 | 0 | −1 | 73 | 23 | 95 |
|  |  |  |  | 93 | 0 | 0 | 73 | 23 | 95 |
|  |  |  |  | 94 | 0 | −1 | 73 | 22 | 94 |
|  |  |  |  | 95 | 0 | −0 | 73 | 22 | 94 |
|  |  |  |  | 96 | 0 | −1 | 73 | 21 | 93 |
|  |  |  |  | 97 | 0 | 0 | 73 | 21 | 93 |
|  |  |  |  | 98 | 0 | −1 | 73 | 20 | 92 |
| 00111 00111100 | 13 | 28 60 | | 99 | 0 | 0 | 73 | 20 | 92 |
|  |  |  |  | 100 | 0 | 0 | 73 | 20 | 92 |
|  |  |  |  | 101 | 0 | 0 | 73 | 20 | 92 |
|  |  |  |  | 102 | 0 | 0 | 73 | 20 | 92 |
|  |  |  |  | 103 | 0 | 0 | 73 | 20 | 92 |
|  |  |  |  | 104 | 0 | 0 | 73 | 20 | 92 |
|  |  |  |  | 105 | 0 | 0 | 73 | 20 | 92 |
|  |  |  |  | 106 | 0 | 0 | 73 | 20 | 92 |
|  |  |  |  | 107 | 0 | 0 | 73 | 20 | 92 |
|  |  |  |  | 108 | 0 | 0 | 73 | 20 | 92 |
|  |  |  |  | 109 | 0 | 0 | 73 | 20 | 92 |
|  |  |  |  | 110 | 0 | 0 | 73 | 20 | 92 |
|  |  |  |  | 111 | 0 | 0 | 73 | 20 | 92 |
|  |  |  |  | 112 | 0 | 0 | 73 | 20 | 92 |
|  |  |  |  | 113 | 0 | 0 | 73 | 20 | 92 |
|  |  |  |  | 114 | 0 | 0 | 73 | 20 | 92 |
|  |  |  |  | 115 | 0 | 0 | 73 | 20 | 92 |
|  |  |  |  | 116 | 0 | 0 | 73 | 20 | 92 |
|  |  |  |  | 117 | 0 | 0 | 73 | 20 | 92 |

TABLE 4-continued

| | | | | | | | |
|---|---|---|---|---|---|---|---|
| | | | 118 | 0 | 0 | 73 | 20 | 92 |
| | | | 119 | 0 | 0 | 73 | 20 | 92 |
| | | | 120 | 0 | 0 | 73 | 20 | 92 |
| | | | 121 | 0 | 0 | 73 | 20 | 92 |
| | | | 122 | 0 | 0 | 73 | 20 | 92 |
| | | | 123 | 0 | 0 | 73 | 20 | 92 |
| | | | 124 | 0 | 0 | 73 | 20 | 92 |
| | | | 125 | 0 | 0 | 73 | 20 | 92 |
| | | | 126 | 0 | 0 | 73 | 20 | 92 |
| | | | 127 | 0 | 0 | 73 | 20 | 92 |
| | | | 128 | 0 | 0 | 73 | 20 | 92 |
| | | | 129 | 0 | 0 | 73 | 20 | 92 |
| | | | 130 | 0 | 0 | 73 | 20 | 92 |
| | | | 131 | 0 | 0 | 73 | 20 | 92 |
| | | | 132 | 0 | 0 | 73 | 20 | 92 |
| | | | 133 | 0 | 0 | 73 | 20 | 92 |
| | | | 134 | 0 | 0 | 73 | 20 | 92 |
| | | | 135 | 0 | 0 | 73 | 20 | 92 |
| | | | 136 | 0 | 0 | 73 | 20 | 92 |
| | | | 137 | 0 | 0 | 73 | 20 | 92 |
| | | | 138 | 0 | 0 | 73 | 20 | 92 |
| | | | 139 | 0 | 0 | 73 | 20 | 92 |
| | | | 140 | 0 | 0 | 73 | 20 | 92 |
| | | | 141 | 0 | 0 | 73 | 20 | 92 |
| | | | 142 | 0 | 0 | 73 | 20 | 92 |
| | | | 143 | 0 | 0 | 73 | 20 | 92 |
| | | | 144 | 0 | 0 | 73 | 20 | 92 |
| | | | 145 | 0 | 0 | 73 | 20 | 92 |
| | | | 146 | 0 | 0 | 73 | 20 | 92 |
| | | | 147 | 0 | 0 | 73 | 20 | 92 |
| | | | 148 | 0 | 0 | 73 | 20 | 92 |
| | | | 149 | 0 | 0 | 73 | 20 | 92 |
| | | | 150 | 0 | 0 | 73 | 20 | 92 |
| | | | 151 | 0 | 0 | 73 | 20 | 92 |
| | | | 152 | 0 | 0 | 73 | 20 | 92 |
| | | | 153 | 0 | 0 | 73 | 20 | 92 |
| | | | 154 | 0 | 0 | 73 | 20 | 92 |
| | | | 155 | 0 | 0 | 73 | 20 | 92 |
| | | | 156 | 0 | 0 | 73 | 20 | 92 |
| | | | 157 | 0 | 0 | 73 | 20 | 92 |
| | | | 158 | 0 | 0 | 73 | 20 | 92 |
| 10110 | 5 | 13 | 159 | 0 | 1 | 73 | 21 | 93 |
| 11011 0010 | 9 | 27 4 | 160 | 0 | 0 | 73 | 21 | 93 |
| | | | 161 | 0 | 0 | 73 | 21 | 93 |
| | | | 162 | 0 | 0 | 73 | 21 | 93 |
| | | | 163 | 0 | 0 | 73 | 21 | 93 |
| 10010 | 5 | 9 | 164 | −1 | 2 | 72 | 23 | 94 |
| 00110 | 5 | 12 | 165 | 0 | 0 | 72 | 23 | 94 |
| 10110 | 5 | 13 | 166 | 0 | 1 | 72 | 23 | 95 |
| 00010 | 5 | 8 | 167 | −1 | 1 | 71 | 25 | 95 |
| 10110 | 5 | 13 | 168 | 0 | 1 | 71 | 26 | 96 |
| 10010 | 5 | 9 | 169 | −1 | 2 | 70 | 28 | 97 |
| 10010 | 5 | 9 | 170 | −1 | 2 | 69 | 30 | 98 |
| 10111 0111 0010 | 13 | 29 −2 4 | 171 | −2 | 4 | 67 | 34 | 100 |
| 10111 0111 0010 | 13 | 29 −2 4 | 172 | −2 | 4 | 65 | 38 | 102 |
| 01111 0011111 0001000 | 19 | 30 −4 8 | 173 | −4 | 8 | 61 | 46 | 106 |
| 01111 0101111 0011000 | 19 | 30 −6 12 | 174 | −6 | 12 | 55 | 58 | 112 |
| 11011 1100 | 9 | 27 3 | 175 | 0 | 0 | 55 | 58 | 112 |
| | | | 176 | 0 | 0 | 55 | 58 | 112 |
| | | | 177 | 0 | 0 | 55 | 58 | 112 |
| Bitstream length | 252 | | | | | Line length | 2353 | |
| | | COMPLETE SYMBOL | | | | | | |
| Total code length | 753 | | | | | Total line length | 3503 | |

As shown in the above table, the first four bits are taken to be the number of bitstreams in the file, and in the example have a value of three. Therefore: the next twelve bits (value 231) are taken to be the length of the first bitstream; the next twelve bits (value 230), the length of the second bitstream; and the next twelve bits (value 252), the length of the third bitstream. It is thus possible now to locate the start of each bitstream in the file and process the three bitstreams in parallel if desired.

Considering now the first bitstream, the first five bits are taken to be a control code, and the control code has a value of 31. Referring to Table 3, this denotes STROKE_START, and the next 8, 8 and 8 bits (values 87, 60, 6) are thus taken to be the parameters (X, Y, W) of the STROKE_START code. A line is therefore rendered, as shown by the upper-most line in FIG. 1, having a Y value of 60, an $X^-(60)$ starting value of 87, a length W(60) of 6, and thus an $X^+(60)$ ending value of 92 (=$X^-$+W−1).

The next five bits are taken to be a control code, and the control code has a value of 29. Referring to Table 3, this denotes MEDIUM_CHANGE, and the next 4 and 4 bits (values −3, 3) are thus taken to be the parameters ($\Delta X$, $\Delta W$)

of the MEDIUM_CHANGE code. A line is therefore rendered, as shown by the next line in FIG. 1, having a Y value of 61 (i.e. one greater than the previous line), an $X^-(61)$ starting value of 84 (=$X^-(Y-1)+\Delta X$), a length W(61) of 9 (=$W(Y-1)+\Delta W$), and thus an $^+X$ (61) ending value of 92 (=$X^-+W-1$).

The remainder of the first bitstream is analysed and lines are rendered in a similar fashion until the end of the bitstream is reached, thus producing a set of rendered lines as shown in FIG. 1. It should be noted that the last control code of the first bitstream (for Y=81) has a value of 25, denoting MICRO_RUN_CHANGE. Therefore, referring to Table 3, the next bit (value 1) is taken to be the MICRO_RUN_TYPE, the next eight bits (value 6) are taken to be the number of RUN_CHANGES, and the next six pairs of bits (values 3, 2, 3, 1, 2, 3) are taken to be the coded values of those six RUN_CHANGES for the lines with Y values of 81, 82, 83, 84, 85 and 86.

Figure 2:
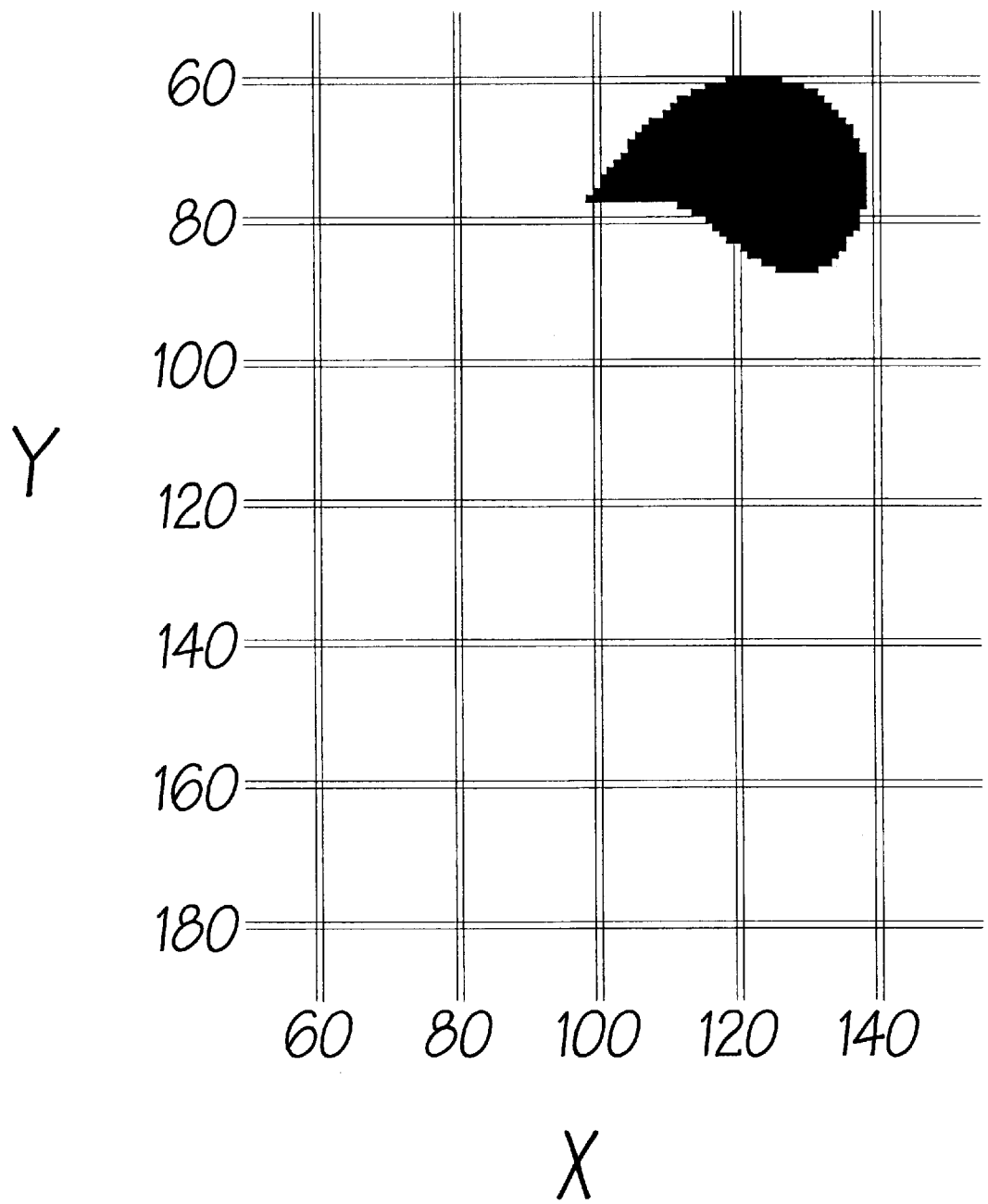
FIGS. 2 & 3 shows second and third strokes produced by decoding second and third bitstreams for forming the letter.
Figure 3:
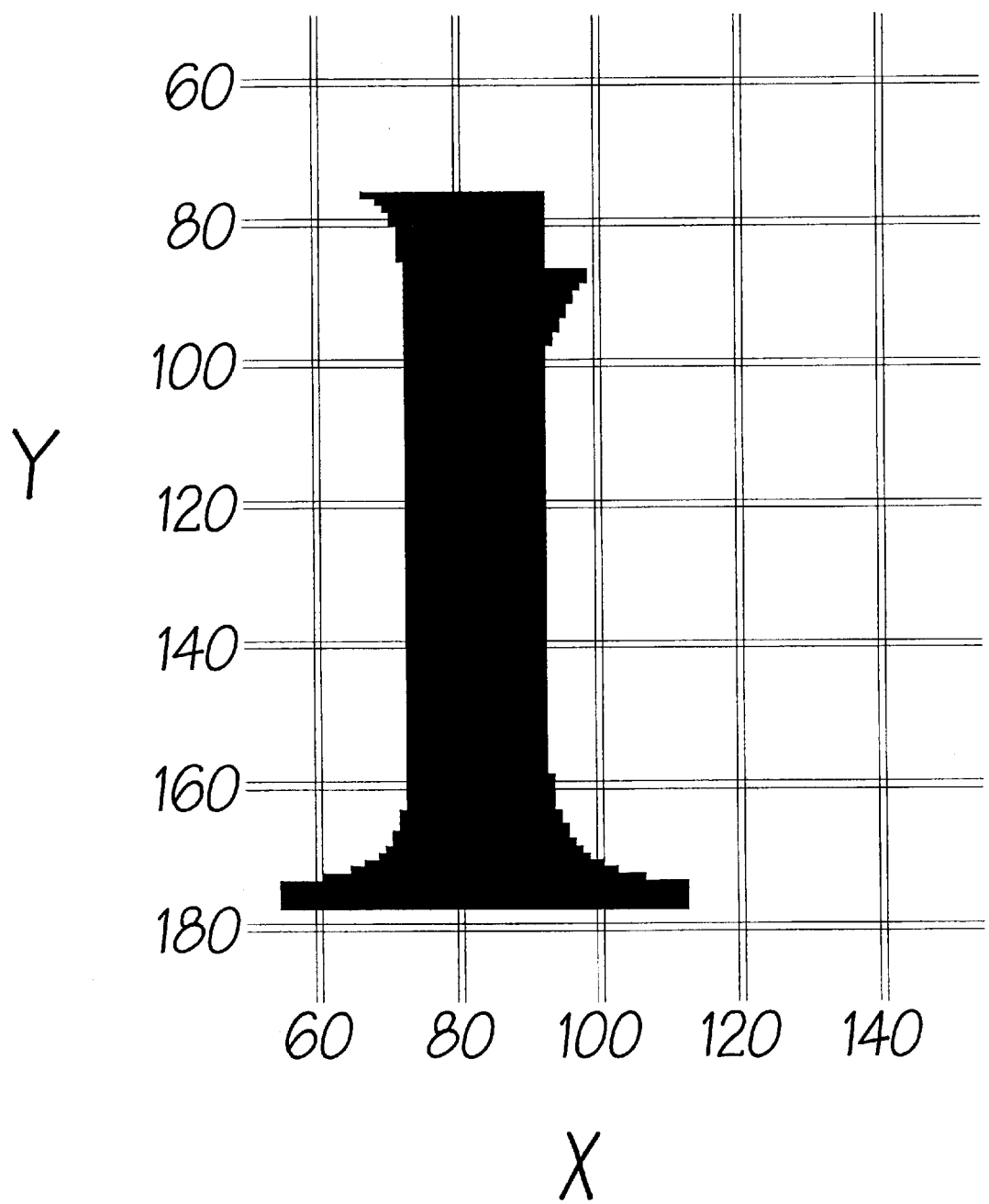

In a similar fashion, the second and third bitstreams are decoded in parallel with the first bitstream, or one after another, to produce the sets of rendered lines shown in FIGS. 2 and 3 respectively. It should be noted that the control code for the line 99 of the third bitstream has a value of 28 denoting REPEAT. Therefore, the next eight bits (value 60) are taken to be the REPEAT_COUNT, i.e. the number of times that the previous line (Y=98) is repeated. Accordingly, the values $X^-$, W, $X^+$ for each of lines 99 to 158 are the same as those for line 98. It will therefore be appreciated that this thirteen bit line code produces 1200 bits of rendered stroke.

Figure 4:
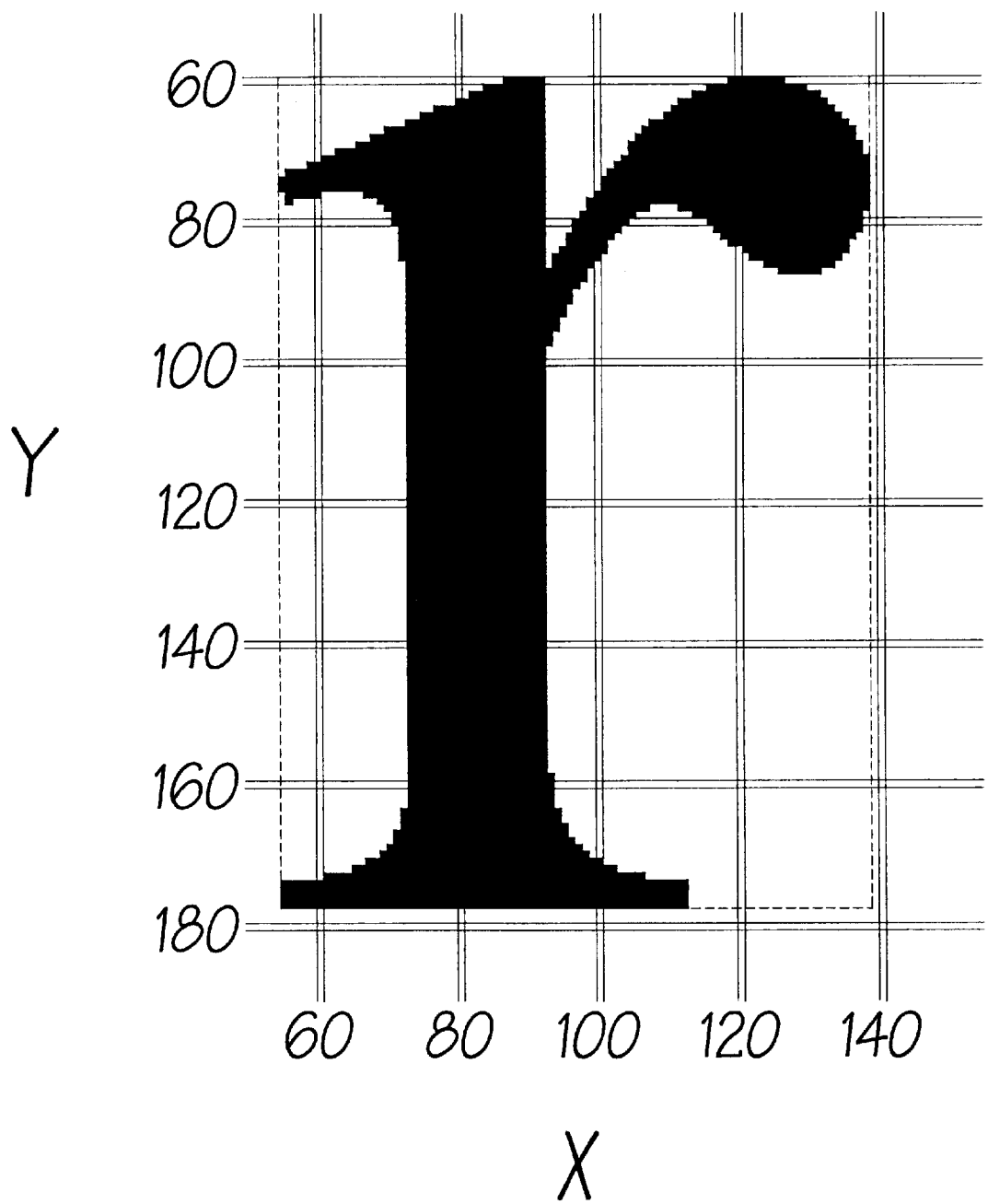
FIG. 4 shows the resulting letter produced by combining the strokes.

It will be appreciated that the lines shown in FIGS. 1 to 3 are rendered in the same memory with the same co-ordinate origin, and therefore in combination the three bitstreams produce a complete symbol as shown in FIG. 4.

It will be noted from the foot of Table 4 that the total length of the code (including the header) to produce the lower case Times Roman "r" is 753 bits. By comparison, if the symbol were presented as a raw bitmap, the length of the bitmap would be 65536 (=$256^2$) bits, and thus the example of the invention produces a lossless compression ratio of over 87:1 compared with a raw bitmap. The upright rectangular area bounding the example symbol and denoted by dashed lines in FIG. 4 has an area of $(X^+_{max}-X^-_{min}+1)$.$(Y_{max}-Y_{min}+1)$=(138-55+1).(177-60+1)=9912 bits. Therefore, if the symbol were presented as a partial bitmap, together with its origin (8+8 bits) and its width (8 bits), the length of the bitmap would be 9936 bits. Accordingly, even by comparison with such a partial bitmap, the example of the present invention produces a substantial lossless compression ratio of over 13:1.

Having described a method of decoding the encoded symbol file, the method of encoding a bitmap to produce such a symbol file is essentially the reverse of the decoding method, but in addition involves the steps of: (a) determining how the symbol is to be divided up (if at all) into a plurality strokes and (if at all) into a plurality of bitstreams; and (b) determining which control code to use when more than one can be used to encode a line.

With regard to step "a" (splitting the symbol), there is no unique way of splitting up the symbol, and optimum performance does depend on the way in which the decoder can decode the symbol file. For example, a single bitstream may be used, with more than one STROKE_START control code being used as necessary to cope with the symbol including more than one line having the same Y value. In the case where the decoder can decode only one bitstream at a time, this may provide optimum performance. An advantage of dividing the data up into a plurality of bitstreams, each with its own entry in the header, is that a decoder which is so capable, can decode the bitstreams in parallel. Some symbols, such as a Times Roman "I", do not need to be split into strokes. If, however, it is divided in two, say the top and bottom halves, with respective bitstreams, the total code length will be slightly greater due to the longer header, the additional STROKE_START control code, and the need to re-establish the repeat for the lower half of the main stem of the symbol. Therefore, the performance of a single channel decoder will be slightly reduced. However, the performance of a dual channel parallel decoder will be almost doubled, although this is dependent on having a suitable decoder architecture to exploit the potential performance increase.

Preferably, when splitting up the symbol, the resultant strokes do not overlap.

With regard to step "b" (choosing the codes), various algorithms may be employed so as to achieve a high compression ratio. For example, for each line, the highest ranking of the following codes may be chosen if it fulfills the stated condition:

| | |
|---|---|
| 7. REPEAT | if it can be used for 32 or more lines; |
| 6. REPEAT_SMALL | if it can be used; |
| 5. MICRO_RUN_CHANGE | if it can be used for five or more lines; |
| 4. LITTLE_CHANGE | if it can be used |
| 3. MEDIUM_CHANGE | if it can be used |
| 2. BIG_CHANGE | if it can be used |
| 1. STROKE_START | |

It will be appreciated that many modifications and developments may be made to the example described above. For instance, some of the line codes mentioned above directly encode the change $\Delta W$ in the length of the line, or the length W of the line itself. Instead, these line codes may directly encode the change $\Delta X^+$ in the position of the right-hand end of the line, or the position $X^+$ itself.

Also, in the example mentioned above, each line extends in the X direction. For some symbol sets, it may be that better compression can be achieved by encoding lines which extend in the Y direction. Furthermore, different symbols, or different strokes in the same symbol, may be encoded with lines extending in the different directions, and, for example, one or more extra bits may be included in the header to define the direction of the lines for the symbol or for each bitstream.

Furthermore, in the above example, each bitstream begins with a STROKE_START control code. This control code is therefore redundant, and accordingly it may be inferred, with only the values of the parameters of the initial STROKE_START control code being specified.

In the basic embodiment of the compression method as described, a representation of the symbol for a character of a fixed point size is held. Ideally this representation is of such a size (in terms of represented pixels) that it captures the detailed structure of each character representation without the storage of any extra unnecessary information. However, many applications of character compression will need a range of font sizes to be represented.

There are a number of ways to generate a number of point sizes from the stored compressed representation. The first and simplest method is simply to hold a number of compressed font descriptions at different sizes and render the character from the appropriate one depending on the font size required. This is inefficient in terms of memory usage, but it is simple and hence particularly applicable where only a limited number of point sizes are needed. This approach also has the advantage that it allows for change of the character shape with point size, which may be desirable for reasons relating to typography.

A second technique for generating a range of character sizes is to scale each character as it is decompressed, either enlarging or reducing as required. The specific details of such text scaling will generally depend upon many characteristics of the application, such as the resolution of the resulting text in terms of number of pixels and the point sizes that are required to be generated. These affect the choice of size for the base character representation and also affect the type of scaling scheme used.

For example, a character may be represented on a 600 dpi grid. One 'point' (a printing unit for text size) is approximately a 72nd of an inch and in this case corresponds to 8.33 pixels. Therefore a text point size of 48 in this case corresponds to 400 pixels, and this is the approximate vertical extent of the tallest character. This size of character can be used as the compressed representation and then scaled by simple integer division on decompression to yield the following point sizes:

| integer divisor | scaled point size |
| --- | --- |
| 1 | 48 |
| 2 | 24 |
| 3 | 16 |
| 4 | 12 |
| 5 | 10 |

Only the one 48 point character is actually stored in compressed form, and the other sizes are generated dynamically from this compressed version as required.

Scaling by integer factors can simplify the rendering of the scaled and decompressed characters. For example, reducing the character size can be done by counting decompressed pixels and outputting a rendered pixel when the counter reaches the divider, then resetting the counter and repeating. Increasing the character size can be done by replication of rendered pixels.

To implement integer scaling in this way some buffering will be required in the rendering hardware to hold a line of pixels such as to allow the scaling to occur in both dimensions. The rendered pixel value depends on how many decompressed pixels with ink occur within each cycle of the counters (considered in both dimensions, this corresponds to a rectangular patch of decompressed pixels). It is also possible to include greyscale capability if needed by counting how many decompressed pixels with ink occur in each rendered pixel and using this to set a grey level.

Other efficient and more flexible scaling schemes based on digital-differential-analyzers (DDA) can be used, or other techniques as used for efficient bitmap scaling can be employed.

Figure 5:
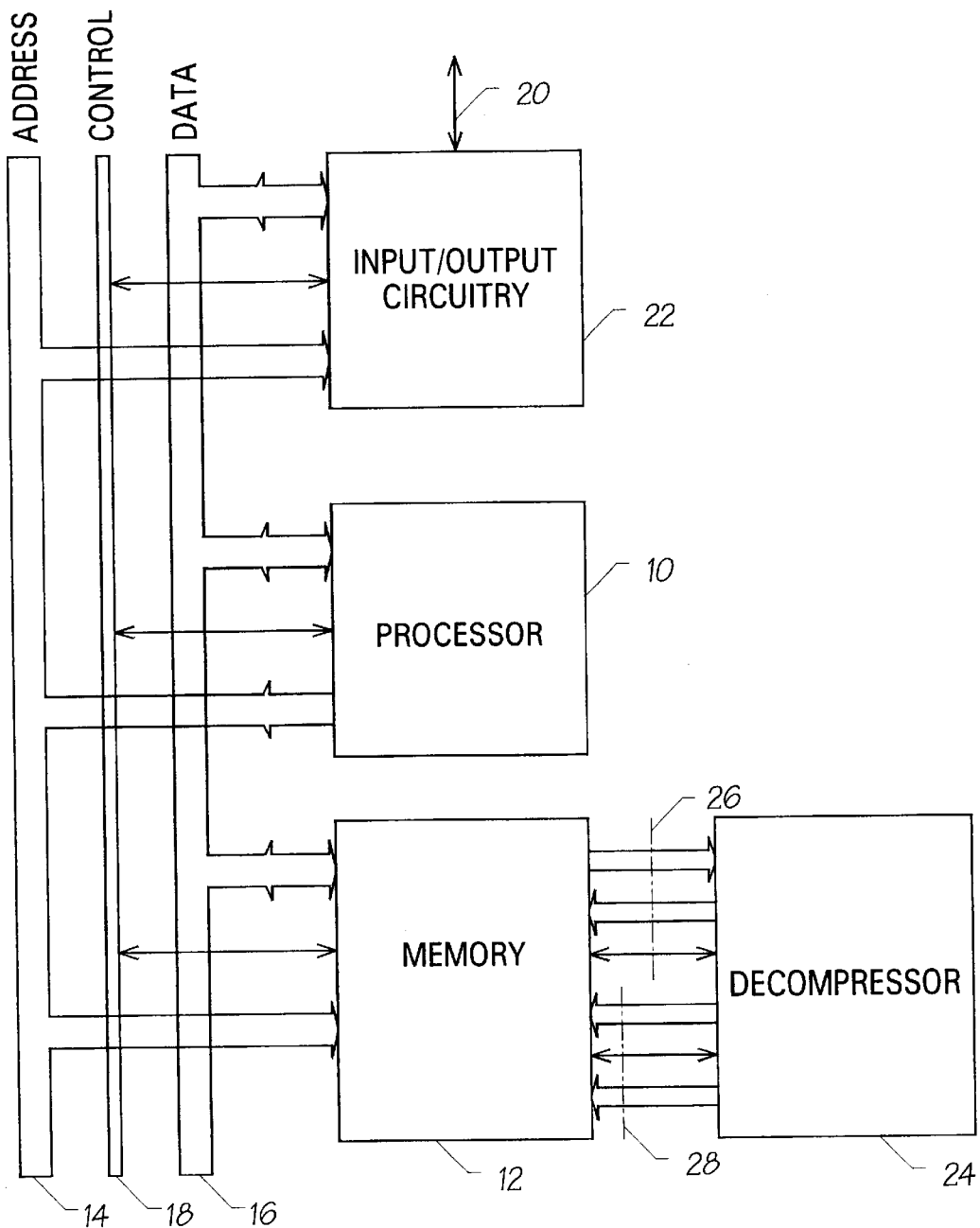
FIG. 5 is a schematic diagram of a computer forming an embodiment of the invention.

An embodiment of an apparatus according to the present invention will now be described with reference to FIGS. 5 and 6. Referring specifically to FIG. 5, a computer such as a PC comprises, in known fashion, a processor 10 which communicates with a memory 12, input/output circuitry 22 and with other devices via an address bus 14, data bus 16 and control bus 18. The input/output circuitry can communicate with external systems via, for example, a telephone line 20. The computer also comprises a decompressor 24 which communicates with the memory 12 via a compressed-font memory interface 26 and a rendered-font memory interface 28. If appropriate, these two memory interfaces may be in common.

Figure 6:
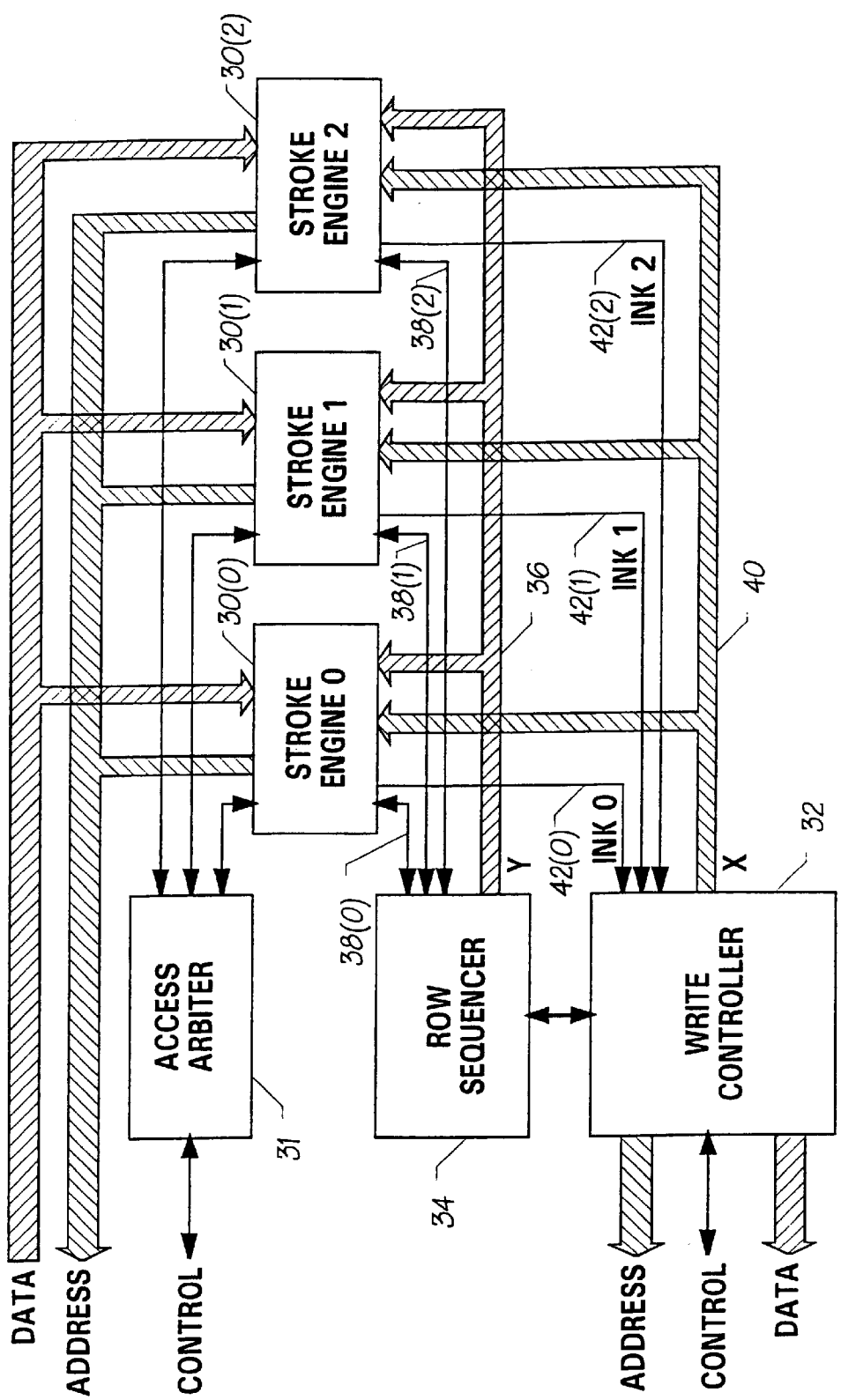
FIG. 6 is a schematic diagram showing more detail of one example of the decompressor shown in FIG. 5, including in this example three stroke-engines.

Referring now to FIG. 6, the decompressor 24 includes a plurality of stroke engines 30(0)–(2) (three in the embodiment shown) connected via address and data buses and control lines to the compressed-font memory interface 26, the connection of the control lines being via an access arbiter 31. The decompressor also includes a write controller 32 connected via address and data buses and a control line to the rendered-font memory interface 28 and also connected to a row sequencer 34. The row sequencer 34 is connected to the stroke engines 30(0)–(2) via a Y-coordinate bus 36 and also individual control lines 38(0)–(2). The write controller 32 is connected to the stroke engines 30(0)–(2) via an X-coordinate bus 40 and individual ink signal lines 42(0)–(2). The stroke engines 30(0)–(2), access arbiter 31, write controller 32 and row sequencer 34 of the decompressor 24 are implemented using logic arrays to perform in the manner described below.

In the embodiment, the decompressor 24 does not decode the header of a symbol file and only deals with the bitstream data. It is probably better to implement header decoding within the controlling host processor software, as it occurs only once per symbol decompression.

The start addresses for the bitstream are pre-loaded by the host processor 10 into the stroke engines 30(0)–(2) before decompression commences. The stroke engines 30(0)–(2) then individually pull bitstream data from the compressed font. The engines 30(0)–(2) asynchronously request the bitstream data, and the local arbiter 31 manages the requests so that one engine at a time is able to read, and so that each has equal access to the compressed data. In practice there could be more or less of the stroke engines 30(0)–(2) depending on the particular implementation, performance requirements and font set.

The row sequencer 34 steps down through the symbol rows. For each row the write controller 32 scans across the row in the X coordinate, a pixel at a time, supplying the X coordinate values to the stroke engines 30(0)–(2) via the X-coordinate bus 40. The stroke engines decode the bitstream data which has been received, and each stroke engine 30(0)–(2) sets its respective 'INK' output on line 42(0)–(2) high when, for the current Y coordinate, the X coordinate falls within the active ink area dealt with by that stroke engine. If necessary, and depending on the memory word-width, the write-controller 32 gathers pixel data into words and then writes those words out to the memory 12. This can occur as the X coordinate is scanned to minimise counter logic. The start address for rendered data is pre-loaded into the write-controller 32 before decompression of a symbol.

A set of control and status registers (hooked into the logic of each block but not shown on the drawing) allow the host processor 10 to set up the decompressor and monitor its activity, detecting also when a stroke or symbol is complete.

Typically the character representation will be decompressed and rendered as bitmap into an area of memory set aside as a font cache or temporary store. This allows rapid bitmap moves to be used subsequently to generate multiple characters either directly onto a display surface, or into a framestore which is used to hold an image of the page or screen for either display or printer applications. The details of memory usage and whether, or how, fonts are cached will therefore depend on the particular application requirements. Such details can readily be determined by the man skilled in the art to meet the requirements of a particular application.

The design described above contains only a small amount of fast logic circuitry, in the write controller 32 and X-coordinate bus 40. The other parts of the apparatus only update every row. The circuitry to generate each INK output within the stroke engine is quite compact.

In an alternative implementation approach which is not shown in the drawings, a large and fairly complex row-register sets INK bits in parallel for a particular stroke-engine with each stroke-engine affecting the register in turn. The row is then built up in only N cycles where N is the number of engines. However the row must still be written out to memory which still involves generating a sequence of word-writes. The approach as shown in FIG. 5 probably uses less logic than the register approach but at the expense of a higher clock-rate for a small part of the logic.

Although an apparatus has been described which uses a combination of a decompressor and a conventional PC, it will be appreciated that the apparatus of the invention may alternatively be implemented by software programming of conventional computer hardware.

What is claimed is:

1. A method of lossless compression of a bitmap of a symbol, comprising:

dividing up the symbol into one or more strokes, such that each stroke comprises a plurality of parallel, laterally adjacent, continuous line segments;

run-length encoding each stroke to form a stream of line codes for that stroke, each line code representing one of the line segments or a group of the line segments, wherein the stream of line codes provides absolute values for position and length of a first line segment and relative values of position and length for other line segments, and presenting the streams of the line codes for the strokes in sequence as a set representing the symbol;

said step of run length encoding further comprising the steps of:

encoding each line or group of lines of that stroke by one of a plurality of encoding methods to form a line code, wherein at least one of the encoding methods produces such a line code comprising: a control code indicative of that encoding method; and at least one parameter value for that control code; and presenting the line codes as a stream in the order in which the lines appear in that stroke, the lines each being encoded in dependence upon their position and length relative to the preceding line in that stroke.

2. A method as claimed in claim 1, further comprising the step of adding a header indicative of the number of streams in the set and the length of each stream.

3. A method of decompressing a losslessly compressed bitmap of a symbol, wherein the symbol has been divided into a plurality of strokes each of which comprises a plurality of parallel, laterally adjacent, continuous line segments, the compressed bitmap comprising for each of the strokes, a plurality of run-length encoded line codes each for one of the line segments or a group of the line segments in that stroke, each line code representing one of the line segments or a group of the line segments, wherein the stream of line codes provides absolute values for position and length of a first line segment and relative values of position and length for other line segments, the line codes being arranged as a stream in the order in which the line segments appear in that stroke, and the streams of the lines codes for the strokes being arranged in sequence as a set representing the symbol, the method comprising the steps of:

decoding each line code in each stream to form a corresponding line definition for one or more line segments for each line code; and rendering each stroke by rendering the one or more line segments defined by each line definition, thereby rendering the losslessly compressed bitmap as a symbol, wherein each line or group of lines of a stroke has been encoded by one of a plurality of encoding methods to form a line code; and the line codes presented as a stream in the order in which the lines appear in that stroke, the lines each being encoded in dependence upon their position and length relative to the preceding line in that stroke, at least one of the encoding methods producing such a line code comprising a control code indicative of that encoding method; and at least one parameter value for that control code, wherein in the case of decoding such a parametered line code, the decoding step comprises the steps of determining the control code in the parametered line code, determining each parameter of that line code, and forming the line definition in accordance with the value of the control code and the value of each parameter.

4. A method of decompressing a losslessly compressed bitmap of a symbol, wherein the symbol has been divided into a plurality of strokes each of which comprises a plurality of parallel, laterally adjacent, continuous line segments, the compressed bitmap comprising for each of the strokes, a plurality of run-length encoded line codes each for one of the line segments or a group of the line segments in that stroke, each line code representing one of the line segments or a group of the line segments, wherein the stream of line codes provides absolute values for position and length of a first line segment and relative values of position and length for other line segments, the line codes being arranged as a stream in the order in which the line segments appear in that stroke, and the streams of the lines codes for the strokes being arranged in sequence as a set representing the symbol, the method comprising the steps of:

decoding each line code in each stream to form a corresponding line definition for one or more line segments for each line code; and rendering each stroke by rendering the one or more line segments defined by each line definition, thereby rendering the losslessly compressed bitmap as a symbol, wherein each line or group of lines of a stroke has been encoded by one of a plurality of encoding methods to form a line code;

and the line codes presented as a stream in the order in which the lines appear in that stroke, the lines each being encoded in dependence upon their position and length relative to the preceding line in that stroke, at least one of the encoding methods producing as such a line code a parameterless control code, wherein, in the case of decoding such a parameterless line code, the decoding step comprises the step of forming the line definition in accordance the value of the control code.

5. A computer comprising:

a processor;

memory accessible by the processor for storing data including a losslessly compressed bitmap of a symbol, wherein the symbol has been divided into a plurality of strokes each of which comprises a plurality of parallel, laterally adjacent, continuous line segments, the compressed bitmap comprising for each of the strokes, a plurality of run-length encoded line codes each for one of the line segments or a group of the line segments in that stroke, each line code representing one of the line segments or a group of the line segments; and a decompressor circuit comprising:

means for generating coordinate value pairs; and at least one stroke engine operable to read a stream of the line codes from the memory and to decode the line codes into corresponding line segments to produce an output signal corresponding to presence or absence of any line segment of the symbol at a generated coordinate value pair, whereby a bitmap rendering of the symbol is provided by the decompressor circuit to the memory.

6. A computer as claimed in claim 5, wherein the decompressor circuit has a plurality of such stroke engines and further includes an access arbiter for arbitrating requests from the stroke engines to access the memory.

7. A computer as claimed in claim 5, wherein the generating means comprises:

a first sequencer which is operable to step through values of one of the coordinates;

a second sequencer which, for each value of said one coordinate, is operable to step through values of the other coordinate; and a write controller which is operable to address the memory in dependence upon the coordinate values and supply data to the memory in dependence upon the output signal or signals.

\* \* \* \* \*